UNITED STATES PATENT OFFICE.

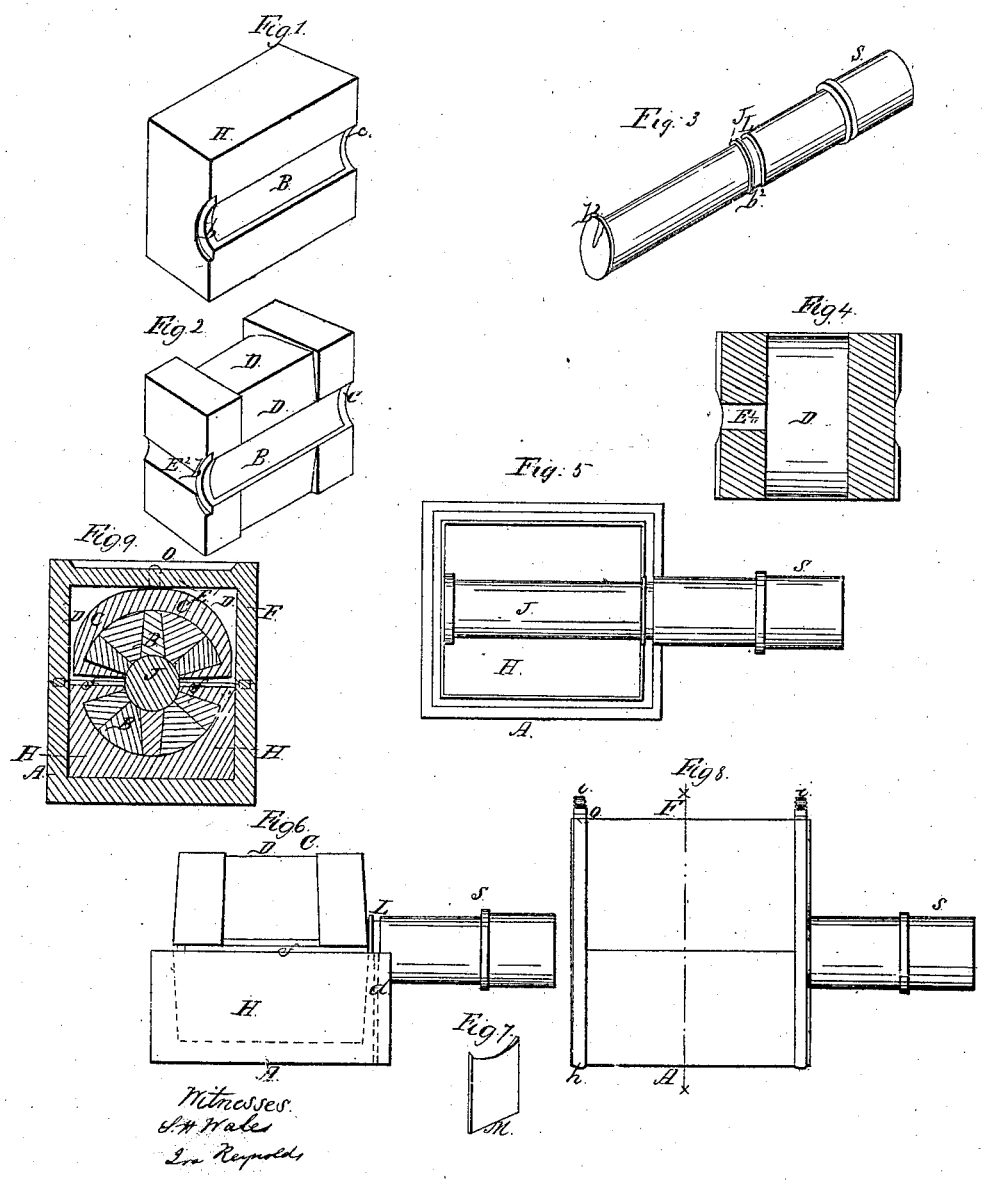

NELSON W. CLARK, OF CLARKSTON, MICHIGAN.

JOURNAL-BOX.

Specification of Letters Patent No. 31,297, dated February 5, 1861.

*To all whom it may concern:*

Be it known that I, NELSON W. CLARK, of Clarkston, in the county of Oakland and State of Michigan, have invented a new and useful Improvement on Journal-Boxes; and I do hereby declare that the following is a full, clear, and exact description, reference being had to the accompanying drawings, forming a part of this specification, in which—

Figure 1 is a perspective view of the lower bearing block. Fig. 2 is a perspective view of the upper bearing block. Fig. 3, is a perspective view of the journal. Fig. 4, is a view of the top of Fig. 2. Fig. 5, is a plan view of the journal in the under half of the journal box. Fig. 6, is a side elevation partly in section showing the upper cap or box of the journal box removed, and showing the lower half of the journal box. Fig. 7 is a view of the wedge or follower to keep the packing tight in the journal box. Fig. 8 is a side elevation of the journal box with the shaft as running therein. Fig. 9, is a transverse section at the dotted line $x\ x$, of Fig. 8.

The same letters indicate like parts in all the figures.

The nature of my invention consists in providing wooden journal bearings, secured in metallic blocks and combined with the same, to lessen the friction, by the journal running therein.

To enable others skilled in the art, to make and use my invention, I will proceed to describe its construction and operation.

The outside casing of my journal box is formed of two hollow shells or boxes A, F, which when coupled together, form a square box outside as represented in Fig. 8. The lower casing A, or outside half of the box is made with a groove $d$, extending from the inside to the outside to receive the wedge or follower M, Fig. 7, which is covered by the coupling band. There is an opening (O,) seen by dotted lines Figs. 8 and 9 made on the top at one end about the middle line of the top of the casing F in Fig. 8, which is to convey the lubricating material to the interior of the box.

H is the lower bearing block. It is made of metal to fit into the lower casing A as represented by the dotted lines Fig. 6. This block is made with a small groove $b'$ to receive the flange $b^2$ of the journal J and with another small groove (C) to receive the flange $b^3$, of the said journal to prevent lateral motion of the journal.

B is the journal bearing. It is made of wood prepared for that purpose in the most suitable manner. An opening is made or cast in the block of a circular form to receive the wood which is firmly wedged therein to present a smooth longitudinal semicircular surface, firmly secured in the metal block as represented in Fig. 1, to receive the journal J of the shaft S. This bearing when well supplied with oil, causes far less friction than metal bearings.

C is the upper bearing block of the journal box. The wood B is secured therein in the same manner as in the block bearing H. This block is formed with a recess D made on its upper surface which extends down its sides to its under surface, as represented in Figs. 2, 4, and 9.

$E'$ is a small canal extending from one of its ends to the recess D to convey lubricating material from the opening $o$ above, to the chamber or recess D. This block bearing fits on to the journal J as represented in Fig. 6, to leave a small space $f$ between the two (upper and lower) bearing blocks, to allow a free supply of lubricating material to the journal J.

$E^2$ is a groove to convey lubricating material to the end of the journal to keep it always supplied. This block is surrounded with the case F like the lower block but the recess D forms an oil reservoir inside to supply the journal at all times with a full and effectual supply of oil or other lubricating material. The blocks and casings are coupled together by bands or clasps $h$ secured with nuts $i$ to form a complete journal box as represented by Fig. 8.

L is a groove, formed by two small circular flanges on the inner end of the journal. This groove is packed with suitable packing to prevent the oil or lubricating material oozing out at the end of the journal box, and as the oil would be more liable to flow out at the lower side and the packing to wear away also, the key or wedge M, Fig. 7, is pushed into the slit $d$ indicated by the dotted lines Fig. 7, to keep the packing always tight around the journal, like a stuffing box, to prevent the oil from oozing out, thus rendering my journal box perfectly oil tight.

I have thus described the three distinct points of my invention, viz.: the combination of the wood bearings in the manner set forth,—the qualities of the journal box as a complete oil reservoir, and lubricating conductor, and also the way of keeping the packing tight, by the wedge. Journals have run on wooden bearings before, but not in the manner as herein described, as combined with the metallic blocks. My wooden bearings endure as long as the metal, and wear perfectly smooth causing less friction than metal, thus making a most excellent oil tight, lubricating conductor, and journal box.

Having thus described my invention what I claim herein as new and desire to secure by Letters Patent is—

In combination with a metallic journal box, the filling of the same with wood for the journal bearings, when arranged and secured substantially as herein described and represented.

NELSON W. CLARK.

Witnesses:
S. H. WALES.
IRA REYNOLDS.